C. SEXTON.
Wheel-Cultivator.

No. 203,656. Patented May 14, 1878.

Attest.
John R Bennett
H. W. Bemis.

Inventor.
Charles Sexton

UNITED STATES PATENT OFFICE.

CHARLES SEXTON, OF JANESVILLE, WISCONSIN.

IMPROVEMENT IN WHEEL-CULTIVATORS.

Specification forming part of Letters Patent No. 203,656, dated May 14, 1878; application filed August 20, 1877.

*To all whom it may concern:*

Be it known that I, CHARLES SEXTON, of Janesville, in the county of Rock and State of Wisconsin, have invented a new and useful Improvement in Wheeled Cultivators, which improvement is fully set forth in the following specification, reference being had to the accompanying drawings, in which—

Figure 1:
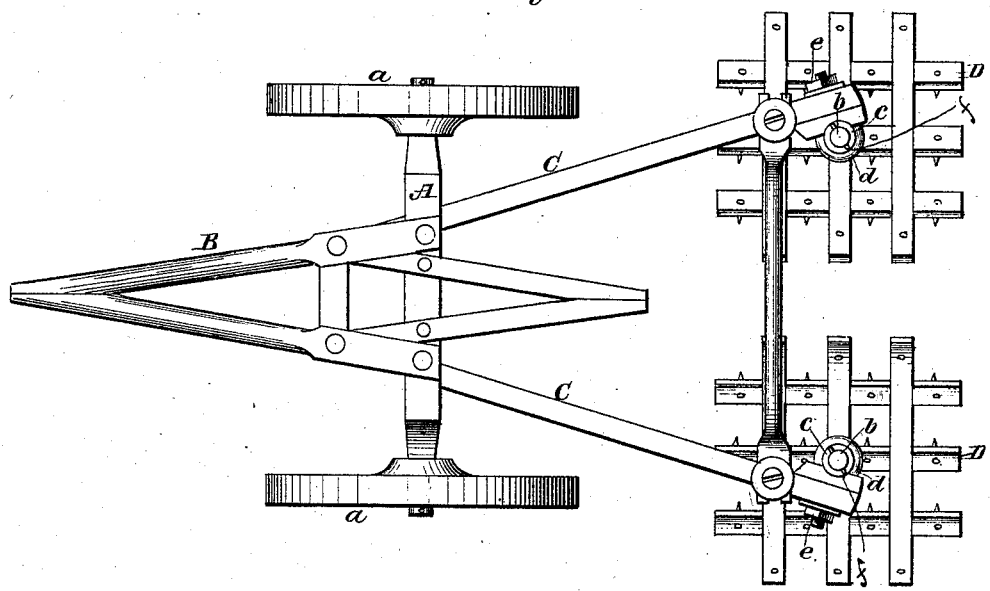
Figure 2:
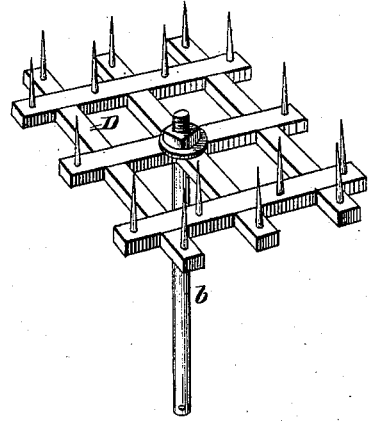

Figure 1 is a top view of my improved cultivator. Fig. 2 is a perspective view of one of the revolving harrow attachments.

The object of my invention is to furnish a wheeled cultivator that will be simple and light, that will cultivate the soil thoroughly on each side of the rows and leave the ground level and smooth, and that will not clog in using.

The invention consists in the improvement of cultivators, as herein fully described.

A, Fig. 1, is the axle of a two-wheeled cultivator, designed for two horses. B is the bifurcated tongue. $a\ a$ are the wheels. C C are shovel-bars, curved upward at the forward ends and pivoted to the under side of the tongue B, and may be pivoted to a cross-bar on the tongue in order to set them nearer together. D D are revolving harrows, attached to the rear ends of the shovel-bars by upright shafts $b\ b$, said shafts working in tubular bearings $c\ c$, held to the shovel-bars by clasps $d\ d$, with shanks passing through the shovel-bars transversely, with nuts $e\ e$ and washers to hold the same in place, so that the harrows will revolve on the under side of the shovel-bars. The upright shafts $b\ b$ do not stand perpendicularly, but the tops incline outwardly, so as to tip the harrows downwardly on the outer edges and raise them up on the inner edges near the rows.

The object of this inclined position of the harrows is to cause the teeth on the outer and lower side to strike deeper into the ground, thereby causing the harrows to revolve; also, to cause the inside teeth to work lightly next to the rows, so as not to injure the plants.

Pins $f\ f$ through the top of the shafts $b\ b$ are to hold the harrow from dropping too low, and are movable. The tubular bearings are adjustable, and can be moved up or down in the clasps in which they are held to give the harrows the right position or elevation.

The revolving harrows D D are made with several bars crossing each other at right angles and halved together, with shafts $b\ b$ secured to the center and standing at right angles to the harrow-bars. Each bar of the revolving harrows is to receive as many teeth as shall be found necessary to work the soil properly, the said revolving harrows to be each of them nearly round, about eighteen inches in diameter, and are designed, when in use, to free themselves from anything that may be caught by the teeth, and the revolving motion has the effect to more thoroughly pulverize the soil and level the ground.

Cultivator teeth or shovels of the ordinary size are used, which are inserted in the shovel-bars C C forward of the revolving harrow attachments, but which are not shown in the drawings, the same being only intended to show with reasonable certainty the above improvement, which can be used upon any wheeled cultivator of the ordinary construction.

Having thus described my invention, what I claim as new, and desire to secure by Letters Patent, is—

The combination of tubular bearings $c\ c$, secured to shovel-bars C C by clasps $d\ d$, shanks, and nuts $e\ e$ with shafts $b\ b$, the several parts being arranged and constructed as and for the purposes set forth.

CHARLES SEXTON.

Witnesses:
JOHN R. BENNETT,
K. W. BEMIS.